(12) United States Patent
Schueler et al.

(10) Patent No.: US 6,660,796 B2
(45) Date of Patent: Dec. 9, 2003

(54) POLYESTER MOLDING COMPOSITION

(75) Inventors: Ralf Schueler, Recklinghausen (DE); Heinz Peirick, Coesfeld (DE); Guido Schmitz, Duelmen (DE); Georg Oenbrink, Duelmen (DE); Harald Haeger, Recklinghausen (DE)

(73) Assignee: Degussa AG, Duesseldorf (DE)

( * ) Notice: Subject to any disclaimer, the term of this patent is extended or adjusted under 35 U.S.C. 154(b) by 35 days.

(21) Appl. No.: 10/022,878

(22) Filed: Dec. 20, 2001

(65) Prior Publication Data

US 2002/0115771 A1 Aug. 22, 2002

(30) Foreign Application Priority Data

Dec. 21, 2000 (DE) .......................................... 100 64 336

(51) Int. Cl.⁷ .............................. C08J 3/00; C08K 3/20; C08K 3/04; C08L 51/00; C08L 77/00
(52) U.S. Cl. ....................... 524/495; 524/504; 524/514; 524/517; 524/539; 525/63; 525/64; 525/66; 525/74
(58) Field of Search ............................... 525/63, 64, 66, 525/74; 524/504, 495, 514, 539, 517

(56) References Cited

U.S. PATENT DOCUMENTS 4,172,859 A  10/1979  Epstein
5,762,849 A  6/1998  Argast et al.

FOREIGN PATENT DOCUMENTS

| CA | 21 40 195 | 7/1995 |
| DE | 26 22 876 | 12/1976 |
| DE | 44 01 165 | 7/1995 |
| EP | 0 561 111 | 9/1993 |
| JP | 62-34951 | 2/1987 |
| JP | 3-250044 | 11/1991 |
| WO | WO 93/08234 | 4/1993 |

*Primary Examiner*—Patrick D. Niland
(74) *Attorney, Agent, or Firm*—Oblon, Spivak, McClelland, Maier & Neustadt, P.C.

(57) ABSTRACT

The present invention relates to a molding composition containing thermoplastic polyesters, impact-modifying component which contains anhydride groups, a copolymer of α-olefin, acrylic compound, olefinically unsaturated epoxide, carboxylic anhydride, carboximide, oxazoline and/or oxazinone, which has improved low-temperature impact strength; methods of making molding with the molding composition and molding containing the composition.

28 Claims, No Drawings

POLYESTER MOLDING COMPOSITION

BACKGROUND OF THE INVENTION

1. Field of the Invention

The invention relates to a material having good low-temperature impact strength and comprising, besides polyester as matrix polymer, at least two other polymers which act synergistically to improve the impact strength of the material. The invention further relates to moldings made from this material.

2. Discussion of the Background

Engineering components such as those used in the automotive industry sector nowadays have to fulfill very strict requirements with respect to low-temperature impact strength. To this end, tests are carried out using a variety of methods at test temperatures of, for example, −40° C.

However, thermoplastic polyesters that are used for automotive engineering components, for example as a barrier layer material for suppressing diffusion of fuel components through the wall of, for example, fuel lines, are to some extent brittle. Therefore, the developer is forced to modify these barrier layer materials in order to fulfill the appropriate requirements placed upon low-temperature impact strength. The modifiers commonly used for low impact strength, for example, EPM rubbers or EPDM rubbers, are materials which have a specific adverse effect on the barrier properties of polyesters with respect to fuels. Therefore, the content of modifiers for low-temperature impact strength cannot be increased as desired. Impact-modified polyesters are described in, for example, DE-A 26 22 876 or DE-A4401 165.

Another difficulty facing the developer of moldings is that thermoplastic polyesters have poor compatibility with the usual modifiers for low-temperature impact strength, for example, EPM or EPDM, even when these have been functionalized and contain anhydride groups, which is usually accomplished by free-radical grafting of the rubber with an ethylenically unsaturated anhydride. Poor compatibility is seen in poor bonding of the dispersed rubber to the matrix of the material at the phase boundary. Therefore, to achieve the desired low-temperature impact strength effect, very high concentrations of an EPM- or EPDM-based impact modifier have to be used. However, there is an adverse effect on other important properties, such as barrier action, resistance to solvents or to chemicals.

Therefore, a critical need exists to provide polyester molding compositions with improved low-temperature impact strength, and in particular to provide polyester molding compositions with good low-temperature impact strength but with the lowest possible content of impact modifiers, so that there is the smallest possible effect on other important properties. Furthermore, there is a need to provide moldings which have good low-temperature impact strength without making the barrier action with respect to fuel components, the solvent resistance or the chemicals resistance, unacceptably poorer than those of the matrix material.

SUMMARY OF THE INVENTION

These objects are achieved with a molding composition which comprises the following components:

I. from 60 to 96.6 parts by weight of thermoplastic polyesters,
II. from 3 to 39.5 parts by weight of an impact-modifying component which contains anhydride groups, where the impact-modifying component is selected from the group consisting of ethylene/α-olefin copolymers and styrene-ethylene/butylene block copolymers,
III. from 0.4 to 20 parts by weight of a copolymer which contains units of the following monomers:
  a) from 20 to 94.5% by weight of one or more α-olefins having from 2 to 12 carbon atoms,
  b) from 5 to 79.5% by weight of one or more acrylic compounds, selected from the group consisting of acrylic acid and methacrylic acid and salts thereof, esters of acrylic acid and/or of methacrylic acid with a $C_1$–$C_{12}$ alcohol, which may carry, where appropriate, a free hydroxyl or epoxide function acrylonitrile and methacrylonitrile, acrylamides and methacrylamides, and
  c) from 0.5 to 50% by weight of an olefinically unsaturated epoxide, carboxylic anhydride, carboximide, oxazoline or oxazinone,
  where the total of the parts by weight of components I, II and III is 100.

In preferred embodiments, the molding composition comprises:

I. from 70 to 94 parts by weight, particularly preferably from 75 to 92 parts by weight, of polyester,
II. from 5 to 28 parts by weight, particularly preferably from 6 to 23 parts by weight, and particularly preferably from 7 to 22 parts by weight, of the impact-modifying component, and
III. from 0.6 to 15 parts by weight, particularly preferably from 0.7 to 10 parts by weight, of the copolymer, which preferably contains units of the following monomers:
  a) from 30 to 80% by weight of β-olefin(s),
  b) from 7 to 70% by weight, particularly preferably from 10 to 60% by weight, of the acrylic compound (s), and
  c) from 1 to 40% by weight, particularly preferably from 5 to 30% by weight, of the olefinically unsaturated epoxide, carboxylic anhydride, carboximide, oxazoline, or oxazinone.

Other objects of the present invention include methods of preparing the molding compositions, methods of using the molding composition to make moldings and the molding prepared therein.

DETAILED DESCRIPTION OF THE INVENTION

Polyesters that may be used are thermoplastic polyesters of linear structure. These are prepared by polycondensing diols with dicarboxylic acid or with polyester-forming derivatives of these, such as dimethyl esters. Suitable diols have the formula HO—R—OH, where R is a divalent, branched or unbranched aliphatic and/or cycloaliphatic radical having from 2 to 40 carbon atoms, preferably from 2 to 12 carbon atoms. Suitable dicarboxylic acids have the formula HOOC—R'—COOH where R' is a divalent aromatic radical having from 6 to 20 carbon atoms, preferably from 6 to 12 carbon atoms.

Examples of diols include ethylene glycol, trimethylene glycol, tetramethylene glycol, hexamethylene glycol, neopentyl glycol, cyclohexane-dimethanol, and also the $C_{36}$ diol dimer diol. The diols may be used alone or as a diol mixture.

Examples of aromatic dicarboxylic acids include terephthalic acid, isophthalic acid, 1,4-, 1,5-, 2,6- or 2,7-naphthalenedicarboxylic acid, diphenic acid and diphenyl ether 4,4'-dicarboxylic acid. Up to 30 mol % of these dicarboxylic acids may have been replaced by aliphatic or cycloaliphatic dicarboxylic acids having from 3 to 50 carbon atoms and more preferably having from 6 to 40 carbon atoms, e.g. succinic acid, adipic acid, sebacic acid, dodecanedioic acid or cyclohexane-1,4-dicarboxylic acid.

Examples of suitable polyesters include polyethylene terephthalate, polypropylene terephthalate, polybutylene terephthalate, polyethylene 2,6-naphthalate, polypropylene 2,6-naphthalate and polybutylene 2,6-naphthalate.

The preparation of these polyesters has been described previously, for example, see DE-A 24 07 155, DE-A 24 07 156; Ullmanns Encyclopädie der technischen Chemie [Ullmann's Encyclopedia of Industrial Chemistry], 4$^{th}$ Edn., Vol. 19, pp. 65 et seq, Verlag Chemie, Weinheim, 1980, the contents of which are incorporated by reference.

Preferred suitable ethylene/α-olefin copolymers of component II include:

ethylene/$C_3$–$C_{12}$-α-olefin copolymers containing from 20 to 96% by weight, preferably from 25 to 85% by weight, of ethylene. Examples of $C_3$–$C_{12}$-α-olefins used are propene, 1-butene, 1-pentene, 1-hexene, 1-octene, 1-decene or 1-dodecene. Typical examples of these materials are ethylene-propylene rubber and also LLDPE and VLDPE.

ethylene/$C_3$–$C_{12}$-α-olefin/unconjugated-diene terpolymers containing from 20 to 96% by weight, preferably from 25 to 85% by weight, of ethylene and up to at most about 10% by weight of an unconjugated diene, such as bicyclo[2.2.1]heptadiene, 1,4-hexadiene, dicyclopentadiene or in particular 5-ethylidenenorbornene. Examples of suitable $C_3$–$C_{12}$-α-olefins are propene, 1-butene, 1-pentene, 1-hexene, 1-octene, 1-decene or 1-dodecene.

The preparation of these copolymers or terpolymers with the aid of a Ziegler-Natta catalyst has been described previously (Kirk-Othmer, Encyclopedia of Chemical Technology, Fourth Edition, Vol. 8, pp. 978–989, John Wiley & Sons, Inc., New York, 1993).

The styrene-ethylene/butylene block copolymers preferably used include styrene-ethylene/butylene-styrene block copolymers (SEBS), which are obtainable by hydrogenating styrene-butadiene-styrene block copolymers. However, diblock systems (SEB) or multiblock systems may also be used. Block copolymers of this type have been described previously (Kirk-Othmer, Encylcopedia of Chemical Technology, Fourth Edition, Vol. 9, pp. 15–37, John Wiley & Sons, Inc., New York, 1993).

Component II contains anhydride groups which may be introduced by thermal or free-radical reaction with an unsaturated dicarboxylic anhydride, with an unsaturated dicarboxylic acid, or with an unsaturated monoalkyl dicarboxylate by methods known in the art (U.S. Pat. No. 4,174,358). Examples of suitable reagents include maleic acid, maleic anhydride, monobutyl maleate, fumaric acid, aconitic acid or itaconic anhydride. Using this method, it is preferable to graft from 0.1 to 4% by weight of an unsaturated anhydride onto impact-modifying component II. Furthermore, as known in the art it is also possible for another unsaturated monomer, such as styrene, α-methylstyrene or indene, to be grafted on together with the unsaturated dicarboxylic anhydride or its precursor.

Examples of monomers used in the makeup of the copolymer of component III include, among others:

a) α-olefins, such as ethylene, propene, 1-butene, 1-pentene, 1-hexene, 1-octene, 1-decene or 1-dodecene;

b) acrylic acid, methacrylic acid or salts thereof, for example with $Na^+$ or $Zn^{2+}$ as counterions; methyl acrylate, ethyl acrylate, n-propyl acrylate, n-butyl acrylate, isobutyl acrylate, n-hexyl acrylate, n-octyl acrylate, 2-ethylhexyl acrylate, isononyl acrylate, dodecyl acrylate, methyl methacrylate, ethyl methacrylate, n-propyl methacrylate, n-butyl methacrylate, isobutyl methacrylate, 2-ethylhexyl methacrylate, hydroxyethyl acrylate, 4-hydroxybutyl methacrylate, glycidyl acrylate, glycidyl methacrylate, acrylonitrile, methacrylonitrile, acrylamide, N-methylacrylamide, N,N-dimethylacrylamide, N-ethylacrylamide, N-hydroxyethylacrylamide, N-propylacrylamide, N-butylacrylamide, N-(2-ethylhexyl)acrylamide, methacrylamide, N-methylmethacrylamide, N,N-dimethylmethacrylamide, N-ethyl-methacrylamide, N-hydroxyethylmethacrylamide, N-propylmethacrylamide, N-butylmethacrylamide, N,N-dibutylmethacrylamide, N-(2-ethylhexyl) methacrylamide;

c) vinyloxirane, allyloxirane, glycidyl acrylate, glycidyl methacrylate, maleic anhydride, aconitic anhydride, itaconic anhydride, and also the dicarboxylic acids arising from these anhydrides by reacting with water; maleimide, N-methylmaleimide, N-ethylmaleimide, N-butylmaleimide, N-phenylmaleimide, aconitimide, N-methylaconitimide, N-phenylaconitimide, itaconimide, N-methylitaconimide, N-phenylitaconimide, N-acryloylcaprolactam, N-methacryloylcaprolactam, N-acryloyllaurolactam, N-methacryloyllaurolactam, vinyloxazoline, isopropenyloxazoline, allyloxazoline, vinyloxazinone or isopropenyloxazinone. If glycidyl acrylate or glycidyl methacrylate are used, these may serve simultaneously as an acrylic compound b), and if the amount of glycidyl (meth)acrylate is adequate, therefore, there is no need for another acrylic compound to be present. Preferably, the adequate amount is at least 5.5% by weight.

A prefered copolymer includes:

a) from 20 to 94.5% by weight of one or more α-olefins having from 2 to 12 carbon atoms, b) from 0 to 79.5% by weight of one or more acrylic compounds, selected from the group consisting of
   acrylic acid and methacrylic acid and salts thereof,
   esters of acrylic acid and/or of methacrylic acid with a $C_1$–$C_{12}$ alcohol,
   acrylonitrile and methacrylonitrile,
   acrylamides and methacrylamides, and c) from 0.5 to 80% by weight of an ester of acrylic acid or methacrylic acid, where the ester contains an epoxy group,
   where the total of b) and c) is at least 5.5% by weight.

The copolymer of component III may also contain a small amount of other copolymerized monomers, such as dimethyl maleate, dibutyl fumarate, diethyl itaconate or styrene, as long as these do not significantly adversely affect the desired effects.

The preparation of these copolymers are known in the art (Hans-Georg Elias, Makromolekule, Vol. 1, 6$^{th}$ Ed., Wiley-VCH, Weinheim, 1999, pages 376–416 and Hans-Georg Elias, Markromolekule, Vol. 3, 6$^{th}$ Ed., Wiley-VCH, pages 163 ff). These copolymers may also be obtained from commercial sources, for example as LOTADER® (Elf Atochem; ethylene/acrylate/tercomponent or ethylene/glycidyl methacrylate).

In one advantageous embodiment, some of the polyester of component I is replaced by a polyamine-polyamide copolymer, specifically from 0.1 to 10 parts by weight, preferably from 0.2 to 5 parts by weight and particularly preferably from 0.25 to 3 parts by weight. The polyamine-polyamide copolymer is prepared using the following monomers:

a) from 0.5 to 25% by weight, preferably from 1 to 20% by weight, and particularly preferably from 1.5 to 16% by weight, based on the polyamine-polyamide copolymer, of a polyamine having at least 4 nitrogen atoms, preferably at least 8 nitrogen atoms, and particularly preferably at least 11 nitrogen atoms and a number-average molar mass $M_n$ of at least 146 g/mol, preferably at least 500 g/mol, and particularly preferably at least 800 g/mol, and b) polyamide-forming monomers selected from the group consisting of lactams, ω-aminocarboxylic acids and/or equimolar combinations of diamine and dicarboxylic acid.

In one embodiment, the amino group concentration in the polyamine-polyamide copolymer is in the range from 100 to 2500 mmol/kg.

Examples of classes of substances which may be used as polyamine are the following:

polyvinylamines (Römpp Chemie Lexikon [Römpp's Chemical Encyclopedia], 9th edition, Vol. 6, p. 4921, Georg Thieme Verlag Stuttgart, 1992);

polyamines which are prepared from alternating polyketones (DE-A 196 54 058);

dendrimers, such as $((H_2N-(CH_2)_3)_2N-(CH_2)_3)_2-N$ $(CH_2)_2-N((CH_2)_2-N ((CH_2)_3-NH_2)_2)_2$ (DE-A-196 54 179) or tris(2-aminoethyl)amine, N,N-bis(2-aminoethyl)-N',N'-bis[2-[bis(2-aminoethyl)amino]ethyl]-1,2-ethanediamine, 3,15-bis(2-aminoethyl)-6,12-bis[2-[bis(2-aminoethyl)amino]ethyl]-[2[bis[2-[bis (2-aminoethyl)amino]ethyl]amino]ethyl]-3,6,9,12,15-pentaaza-heptadecane-1,17-diamine (J. M. Warakomski, Chem. Mat. 1992, 4, 1000–1004);

linear polyethyleneimines, which can be prepared by polymerizing 4,5-dihydro-1,3-oxazoles, followed by hydrolysis (Houben-Weyl, Methoden der Organischen Chemie [Methods in organic chemistry], Vol. E20, pp. 1482–1487, Georg Thieme Verlag Stuttgart, 1987);

branched polyethyleneimines, which can be obtained by polymerizing aziridines (Houben-Weyl, Methoden der Organischen Chemie [Methods in organic chemistry], Vol. E20, pp. 1482–1487, Georg Thieme Verlag Stuttgart, 1987) and generally have the following distribution of amino groups:

from 25 to 46% of primary amino groups,
from 30 to 45% of secondary amino groups, and
from 16 to 40% of tertiary amino groups.

In the preferred case, the polyamine has a number-average molar mass $M_n$ of not more than 20 000 g/mol, particularly preferably not more than 10 000 g/mol, and in particular preferably not more than 5000 g/mol.

Lactams or ω-aminocarboxylic acids which are used as polyamide-forming monomers contain from 4 to 19 carbon atoms, in particular from 6 to 12 carbon atoms. It is particularly preferable to use ω-caprolactam, ω-aminocaproic acid, caprylolactam, ω-aminocaprylic acid, laurolactam, ω-aminododecanoic acid and/or ω-aminoundecanoic acid.

Examples of combinations of di amine and dicarboxylic acid are hexamethylenediamine/adipic acid, hexamethylenediamine/dodecanedioic acid, octamethylenediamine/sebacic acid, decamethylenediamine/sebacic acid, decamethylenediamine/dodecanedioic acid, dodecamethylenediamine/dodecanedioic acid and dodecamethylene-diamine/2,6-naphthalenedicarboxylic acid. Furthermore, other combinations may be used, such as decamethylenediamine/dodecanedioic acid/terephthalic acid, hexamethylenediamine/adipic acid/terephthalic acid, hexamethylenediamine/adipic acid/caprolactam, decamethylenediamine/dodecanedioic acid/ω-aminoundecanoic acid, decamethylenediamine/dodecanedioic acid/laurolactam, decamethylenediamine/terephthalic acid/laurolactam or dodecamethylenediamine/2,6-naphthalenedicarboxylic acid/laurolactam.

In one preferred embodiment, the polyamine-polyamide copolymer is prepared with the additional use of an oligocarboxylic acid which has been selected from the class consisting of from 0.015 to about 3 mol % of dicarboxylic acid and from 0.01 to about 1.2 mol % of tricarboxylic acid, based in each case on the total of the other polyamide-forming monomers. When the equivalent combination of diamine and dicarboxylic acid is used, calculation of these proportions includes each of these monomers individually. If use is made of a dicarboxylic acid, it is preferable to add from 0.03 to 2.2 mol %, particularly preferably from 0.05 to 1.5 mol %, very particularly preferably from 0.1 to 1 mol % and in particular from 0.15 to 0.65 mol %. If use is made of a tricarboxylic acid, it is preferable to use from 0.02 to 0.9 mol %, particularly preferably from 0.025 to 0.6 mol %, very particularly preferably from 0.03 to 0.4 mol %, and in particular from 0.04 to 0.25 mol %. The concomitant use of the oligocarboxylic acid markedly improves resistance to solvents and to fuels, in particular resistance to hydrolysis and alcoholysis compared to the absence of the oligocarboxylic acid.

The oligocarboxylic acid used may comprise any desired di- or tricarboxylic acid having from 6 to 24 carbon atoms, such as adipic acid, suberic acid, azelaic acid, sebacic acid, dodecanedioic acid, isophthalic acid, 2,6-naphthalenedicarboxylic acid, cyclohexane-1,4-dicarboxylic acid, trimesic acid and/or trimellitic acid.

If desired, use may also be made of aliphatic, alicyclic, aromatic, aralkyl and/or alkylaryl-substituted monocarboxylic acids having from 3 to 50 carbon atoms, e.g. lauric acid, unsaturated fatty acids, acrylic acid or benzoic acid, as regulator. Using these regulators can reduce the concentration of amino groups without altering the structure of the molecule. This method can also be used to introduce functional groups, such as double bonds or triple bonds, etc. However, it is desirable for the polyamine-polyamide copolymer to have a substantial proportion of amino groups. The amino group concentration in this copolymer is preferably in the range from 150 to 1500 mmol/kg, particularly preferably in the range from 250 to 1300 mmol/kg and very particularly preferably in the range from 300 to 1100 mmol/kg. For the purposes of the present invention, amino groups here and below are not only amino end groups but also any secondary or tertiary amine functions which may be present in the polyamine.

The polyamine-polyamide copolymers of the invention may be prepared by various processes.

One of these processes includes bringing the lactam and, respectively, ω-aminocarboxylic acid and polyamine together and then carrying out the polymerization or the polycondensation. The oligocarboxylic acid may be added either at the start or during the course of the reaction. However, one preferred method is a two-stage process in which the lactam cleavage and prepolymerization is first carried out in the presence of water (as an alternative, the appropriate ω-aminocarboxylic acids and, respectively, diamines and dicarboxylic acids are used directly and prepolymerized). In the second step, the polyamine is added, while any oligocarboxylic acid used concomitantly is metered in prior to, during or after the prepolymerization. The pressure is then released at temperatures between 200 and 290° C. and polycondensation takes place in a stream of nitrogen or in vacuo.

Another preferred method consists in the hydrolytic degradation of a polyamide to give a prepolymer, and simultaneous or subsequent reaction with the polyamine. It is preferable to use polyamides in which the end-group difference is approximately zero, or in which any oligocarboxylic acid used concomitantly has previously been incorporated by polycondensation. However, the oligocarboxylic acid may also be added at the start of, or in the course of, the degradation reaction.

Using these methods it is possible to prepare ultra-high-branched polyamides with acid values below 40 mmol/kg, preferably below 20 mmol/kg and particularly preferably below 10 mmol/kg. Almost complete conversion is achieved after as little as from one to five hours of reaction time at temperatures of from 200 to 290° C.

If desired, a vacuum phase lasting a number of hours may follow, as another process step. This lasts for at least four hours, preferably for at least six hours, and particularly preferably for at least eight hours, at from 200 to 290° C. After an induction period of a number of hours, the melt viscosity is then observed to increase, probably due to a reaction of amino end groups with one another, with elimination of ammonia and chain-linkage. This further increases the molar mass, and this is particularly advantageous for molding compositions intended for extrusion.

If there is a desire not to complete the reaction in the melt, solid-phase postcondensation of the polyamine-polyamide copolymer as known in the art is also possible. Suitable reaction conditions include reaction temperatures of from about 140° C. to about 5 K below the crystalline melting point $T_m$, preferably temperatures of from 150° C. to about 10 K below $T_m$, using reaction times of from 2 to 48 hours, preferably from 4 to 36 hours, under vacuum or under a stream of inert gas, e.g., nitrogen.

Addition of this copolymer decreases the melt viscosity, and molding compositions of this type are therefore easier to process, while there is no loss of impact strength.

In addition to constituents I to III, the molding composition may also comprise relatively small amounts of additives which are needed to achieve certain properties. Examples of such additive include plasticizers, pigments or fillers, such as carbon black, titanium dioxide, glass beads, hollow glass beads, talc, zinc sulfide, silicates or carbonates, nucleating agents and crystallization accelerators, processing aids, such as waxes, zinc stearate or calcium stearate, long-chain fatty acids, fatty alcohols, fatty esters and fatty amides, and montanic esters, flame retardants, such as magnesium hydroxide, aluminum hydroxide or melamine cyanurate, glass fibers, antioxidants, UV stabilizers, hydrolysis stabilizers, and also additives which give the product antistatic properties or electrical conductivity, e.g. carbon fibers, graphite fibrils, stainless steel fibers or conductivity black.

The molding composition of the invention is used for producing moldings, e.g. for mechanical engineering, or for sports products, in particular for producing engineering components in the automotive industry sector. These are generally tubes, filler necks or containers, in particular for conducting or storing liquids or gases. A tube of this type may have a straight-line or corrugated shape, or may have corrugations only in some of its sections. Corrugated tubes have been described, e.g., see U.S. Pat. No. 5,460,771, which is incorporated herein by reference. Particularly, important applications are for use as a fuel line, as a tank-filling pipe, as a vapor line (i.e. a line which conducts fuel vapors, e.g. ventilation lines), as a coolant-fluid line, as an air-conditioning-system line, or as a fuel tank. The molding composition is also advantageously used for quick connectors, pump housings, fuel-filter housings, activated-carbon canisters, valve housings, anti-surge cups, connectors to plastic fuel tanks, tank filler necks, cable coatings for electrical cables, housings for hydraulic cylinders, windshield wash system lines, clutch lines, reduced-pressure lines, ventilation lines, hydraulic lines or air-brake lines.

The molding composition of the invention may also be used for producing fuel-pump lines or for producing water-supply lines.

All of these moldings may either be composed entirely of the molding composition of the invention or may comprise the molding composition of the invention as one of two or more layers, for example as a reinforcing outer layer or as an intermediate layer, or as an inner layer, for example in a tube having two or more layers or container having two or more layers. Preferably, the other layers will consist of a molding composition based on polyamide, for example, PA6, PA612, PA11, PA12; or on a polyolefin, for example, polyethylene or polypropylene.

Moldings containing the composition of the invention may be produced by any methods known in the art, for example by extrusion, coextrusion, blow molding or injection molding.

Having generally described this invention, a further understanding can be obtained by reference to certain specific examples which are provided herein for purposes of illustration only, and are not intended to be limiting unless otherwise specified.

EXAMPLES

The following materials were used in the experiments:

PES 1: VESTODUR® 2000, a medium-viscosity polybutylene terephthalate (J value: 146 ml/g) from DEGUSSA-HÜLS AG, PES2: Polybutylene 2,6-naphthalate with a J value of 150 ml/g, EXXELOR® VA 1803: a maleic-anhydride-grafted ethylene/propylene rubber as impact-modifying component (EXXON Chemicals)

LOTADER® AX 8900: a random terpolymer made from ethylene, about 32% by weight of acrylates and about 7–9% by weight of glycidyl methacrylate from ATOCHEM Comparative Example A 89 parts by weight of PES1 and 11 parts by weight of EXXELOR® VA 1803 were mixed in the melt, extruded and pelletized using a Berstorff ZE 25 33D twin-screw kneader, at 260° C. and 200 rpm, with a throughput of 10 kg/h. The pellets were then used to produce extruded test specimens for impact testing.

Comparative Example B 89 parts by weight of PES1 and 11 parts by weight of LOTADER® AX 8900 were mixed in the melt, extruded and pelletized using a Berstorff ZE 25 33D twin-screw kneader, at 260° C. and 200 rpm, with a throughput of 10 kg/h. The pellets were then used to produce extruded test specimens for impact testing.

Example 1

89 parts by weight of PES1, 10 parts by weight of EXXELOR® VA 1803 and 1 part by weight of LOTADER® AX 8900 were mixed in the melt, extruded and pelletized using a Berstorff ZE 25 33D twin-screw kneader, at 260° C. and 200 rpm, with a throughput of 10 kg/h. The pellets were then used to produce extruded test specimens for impact testing.

Example 2

As example 1, but PES2 was used instead of PES1.

For measurement of low-temperature impact strength according to SAE J844 (impact weight 445 g, temperature −40° C.), monotubes were extruded with 8 mm external diameter and wall thickness of 1 mm.

TABLE 1

Impact strength at −40° C.

| Molding Composition | Notched impact strength according to ISO 179/1eA [kJ/m$^2$] | SAE J844 Number of fractures in 10 tubes) |
|---|---|---|
| Comparative example A | 5.7 | 10 |
| Comparative example B | 4.1 | 10 |
| Comparison: PES1 | 5.0 | 10 |
| Comparison: PES2 | 3.6 | 10 |
| Example 1 | 11.7 | 0 |
| Example 2 | 9.2 | 0 |

Obviously, numerous modifications and variations on the present invention are possible in light of the above teachings. It is therefore to be understood that within the scope of the appended claims, the invention may be practiced otherwise than as specifically described herein.

The present application claim priority to German Application DE 10064336.1 filed Dec. 21, 2000, the contents of which are incorporated herein by reference.

What is claimed is:

1. A molding composition which consists essentially of the following components:
   I. from 60 to 96.6 parts by weight of thermoplastic polyesters;
   II. from 3 to 39.5 parts by weight of an impact-modifying component which contains anhydride groups, where the impact-modifying component is selected from the group consisting of ethylene/α-olefin copolymers and styrene-ethylene/butylene block copolymers;
   III. from 0.4 to 20 parts by weight of a copolymer which contains units of the following monomers:
      a. from 20 to 94.5% by weight of one or more α-olefins having from 2 to 12 carbon atoms,
      b. from 5 to 79.5% by weight of one or more acrylic compounds selected from the group consisting of: acrylic acid, methacrylic acid, acrylic acid salts, methacrylic acid salts, esters of acrylic acid with a $C_1$–$C_{12}$ alcohol, esters of methacrylic acid with a $C_1$–$C_{12}$ alcohol, acrylonitrile and methacrylonitrile, acrylamides and methacrylamides; and
      c. from 0.5 to 50% by weight of an olefinically unsaturated epoxide, carboxylic anhydride, carboximide, oxazoline or oxazinone, wherein the total of components I, II and III is 100 parts by weight.

2. The molding composition as claimed in claim 1, wherein the copolymer of component III comprises:
   a. from 20 to 94.5% by weight of one or more α-olefins having from 2 to 12 carbon atoms;
   b. from 0 to 79.5% by weight of one or more acrylic compounds selected from the group consisting of acrylic acid, methacrylic acid, acrylic acid salts, methacrylic acid salts, esters of acrylic acid with a $C_1$–$C_{12}$ alcohol, esters of methacrylic acid with a $C_1$–$C_{12}$ alcohol, acrylonitrile, methacrylonitrile, acrylamides and methacrylamides; and
   c. from 0.5 to 80% by weight of an ester of acrylic acid or methacrylic acid, where the ester contains an epoxy group,
   wherein the total of b. and c. is at least 5.5% by weight.

3. The molding composition as claimed in claim 1, wherein the thermoplastic polyester is selected from the group consisting of polyethylene terephthalate, polypropylene terephthalate, polybutylene terephthalate, polyethylene 2,6-naphthalate, polypropylene 2,6-naphthalate and polybutylene 2,6-naphthalate.

4. A molding composition which comprises the following components:
   I. from 60 to 96.6 parts by weight of thermoplastic polyesters;
   II. from 3 to 39.5 parts by weight of an impact-modifying component which contains anhydride groups, where the impact-modifying component is selected from the group consisting of ethylene/α-olefin copolymers and styrene-ethylene/butylene block copolymers;
   III. from 0.4 to 20 parts by weight of a copolymer which contains units of the following monomers:
      a. from 20 to 94.5% by weight of one or more α-olefins having from 2 to 12 carbon atoms,
      b. from 5 to 79.5% by weight of one or more acrylic compounds selected from the group consisting of: acrylic acid, methacrylic acid, acrylic acid salts, methacrylic acid salts, esters of acrylic acid with a $C_1$–$C_{12}$ alcohol, esters of methacrylic acid with a $C_1$–$C_{12}$ alcohol, acrylonitrile and methacrylonitrile, acrylamides and methacrylamides; and
      c. from 0.5 to 50% by weight of an olefinically unsaturated epoxide, carboxylic anhydride, carboximide, oxazoline or oxazinone,
   wherein the total of components I, II and III is 100 parts by weight,
   wherein in component I from 0.1 to 10 parts by weight of the polyester is replaced with a polyamine-polyamide copolymer comprising the following monomers:
      a. from 0.5 to 25% by weight, based on the polyamine-polyamide copolymer, of a polyamine having at least 4 nitrogen atoms and a number-average molar mass $M_n$ of at least 146 g/mol; and
      b. polyamide-forming monomers selected from the group consisting of lactams, ω-aminocarboxylic acids, and equimolar combinations of diamine and dicarboxylic acid.

5. The molding composition as claimed in claim 1, wherein component II is an ethylene/α-olefin copolymer.

6. The molding composition as claimed in claim 5, wherein the ethylene/α-olefin copolymer comprises from 20 to 90% be weight of ethylene.

7. The molding composition as claimed in claim 5, wherein said α-olefin is a $C_3$–$C_{12}$ α-olefin.

8. The molding composition as claimed in claim 7, wherein said α-olefin is selected from the group consisting of propene, 1-butene, 1-pentene, 1-hexene, 1-octene, 1-decane, and 1-dodecene.

9. The molding composition as claimed in claim 5, wherein the ethylene/α-olefin copolymer is an the ethylene/$C_3$–$C_{12}$-α-olefin/unconjugated-diene terpolmer.

10. The molding composition as claimed in claim 9, wherein the the ethylene/$C_3$–$C_{12}$-α-olefin/unconjugated-diene terpolmer comprises from 20 to 96% by weight of ethylene and at most 10% by weight of unconjugated diene.

11. The molding composition as claimed in claim 9, wherein said unconjugated diene is selected from the group consisting of bicyclo[2.2.1]heptadiene, 1,4-hexadiene, dicyclopentadiene, and 5-ethylidenenorbornene.

12. The molding composition as claimed in claim 1, wherein the a-olefin monomer in component IIIa is selected from the group consisting of ethylene, propene, 1-butene, 1-pentene, 1-hexene, 1-octene, 1-decene, and 1-dodecene.

13. The molding composition as claimed in claim 1, which is antistatic.

14. The molding composition as claimed in claim 1, which is electrically conductive.

15. The molding composition as claimed in claim 1, which is antistatic and electrically conductive.

16. A molding composition which consists essentially of the following components:
   I. from 60 to 96.6 parts by weight of thermoplastic polyesters;
   II. from 3 to 39.5 parts by weight of an impact-modifying component which contains anhydride groups, where the impact-modifying component is selected from the group consisting of ethylene/α-olefin copolymers and styrene-ethylene/butylene block copolymers;
   III. from 0.4 to 20 parts by weight of a copolymer which contains units of the following monomers:
      a. from 20 to 94.5% by weight of one or more α-olefins having from 2 to 12 carbon atoms,
      b. from 5 to 79.5% by weight of one or more acrylic compounds selected from the group consisting of: acrylic acid, methacrylic acid, acrylic acid salts, methacrylic acid salts, esters of acrylic acid with a $C_1$–$C_{12}$ alcohol, esters of methacrylic acid with a $C_1$–$C_{12}$ alcohol, acrylonitrile and methacrylonitrile, acrylamides and methacrylamides; and
      c. from 0.5 to 50% by weight of an olefinically unsaturated epoxide, carboxylic anhydride, carboximide, oxazoline or oxazinone,
   wherein the total of components I, II and III is 100 parts by weight;
   and one or more additives selected from the group consisting of plasticizers, pigments, and fillers.

17. A molding comprising the molding composition as claimed in claim 1.

18. The molding as claimed in claim 17, which is an automotive engineering component.

19. The molding as claimed in claim 17, which is a tube, a filler neck or a container.

20. The molding as claimed in claim 17, which is selected from the group consisting of a fuel line, a tank-filling pipe, a vapor line, a fuel-pump line, a coolant-liquid line, an air-conditioning-system line, a fuel container, a quick connector, a pump housing, a fuel-filter housing, an activated-carbon canister, a valve housing, an anti-surge cup, a connector to a plastic fuel tank, a tank filler neck, a cable coating for an electrical cable, a housing for a hydraulic cylinder, a windshield wash system line, a clutch line, a reduced-pressure line, a ventilation line, a hydraulic line, an air-brake line, and a water-supply line.

21. A molding comprising at least two layers, which comprises the molding composition as claimed in claim 1 as one of two or more layers.

22. The molding as claimed in claim 21, which is a tube having two or more layers.

23. A method of producing a molding comprising forming the molding composition as claimed in claim 1 into said molding.

24. The method as claimed in claim 23, wherein said molding is an automotive engineering component.

25. The method as claimed in claim 23, wherein said molding is a tube, a filler neck or a container.

26. The method as claimed in claim 23, wherein said molding is selected from the group consisting of a fuel line, a tank-filling pipe, a vapor line, a fuel-pump line, a coolant-liquid line, an air-conditioning-system line, a fuel container, a quick connector, a pump housing, a fuel-filter housing, an activated-carbon canister, a valve housing, an anti-surge cup, a connector to a plastic fuel tank, a tank filler neck, a cable coating for an electrical cable, a housing for a hydraulic cylinder, a windshield wash system line, a clutch line, a reduced-pressure line, a ventilation line, a hydraulic line, an air-brake line, and a water-supply line.

27. The method as claimed in claim 23, wherein said forming comprises one or more methods selected from the group consisting of extruding, coextruding, blow molding, and injection molding.

28. A method of making the molding composition as claimed in claim 1 comprising mixing components I, II and III.

* * * * *